United States Patent
Ikeda et al.

(10) Patent No.: US 8,304,655 B2
(45) Date of Patent: Nov. 6, 2012

(54) BUSBAR FOR RESIN BASE OF BATTERY CONNECTION BOARD

(75) Inventors: Tomohiro Ikeda, Makinohara (JP); Shigeyuki Ogasawara, Makinohara (JP); Kouichiro Mochizuki, Makinohara (JP); Keizo Aoki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 311 days.

(21) Appl. No.: 12/762,647

(22) Filed: Apr. 19, 2010

(65) Prior Publication Data

US 2010/0288532 A1 Nov. 18, 2010

(30) Foreign Application Priority Data

May 18, 2009 (JP) ................... 2009-119981

(51) Int. Cl.
*H01B 5/02* (2006.01)
(52) U.S. Cl. .................................................. 174/133 B
(58) Field of Classification Search ............... 174/133 B, 174/68.2, 72 B, 71 B, 70 B, 99 B, 149 B, 174/94 R; 361/608, 624; 429/211
See application file for complete search history.

(56) References Cited

U.S. PATENT DOCUMENTS

| | | | | | |
|---|---|---|---|---|---|
| 2,913,516 | A | * | 11/1959 | Blease | 174/171 |
| 3,170,092 | A | * | 2/1965 | Adams et al. | 361/608 |
| 5,847,321 | A | * | 12/1998 | Carle et al. | 174/99 B |
| 6,261,719 | B1 | | 7/2001 | Ikeda et al. | |
| 2004/0040733 | A1 | * | 3/2004 | Yuasa et al. | 174/68.2 |
| 2004/0118589 | A1 | * | 6/2004 | Pierrot et al. | 174/68.2 |

FOREIGN PATENT DOCUMENTS

JP 2000-149909 A 5/2000

* cited by examiner

*Primary Examiner* — Chau Nguyen
(74) *Attorney, Agent, or Firm* — Sughrue Mion, PLLC

(57) ABSTRACT

A busbar for being accommodated in a case includes a metal plate, a regulating portion and a connected portion. The regulating portion is provided at a part of an edge of the metal plate. The regulating portion has a burr extending in a direction opposite to an inserting direction in which the busbar is inserted into the case. The regulating portion is adapted to come in contact with a part of an inner wall of the case so as to regulate a position of the busbar. The connected portion is provided at a part of the edge of the metal plate. The connected portion has a burr extending in the inserting direction. The connected portion is adapted to be disposed so as not to contact the inner wall of the case.

7 Claims, 12 Drawing Sheets

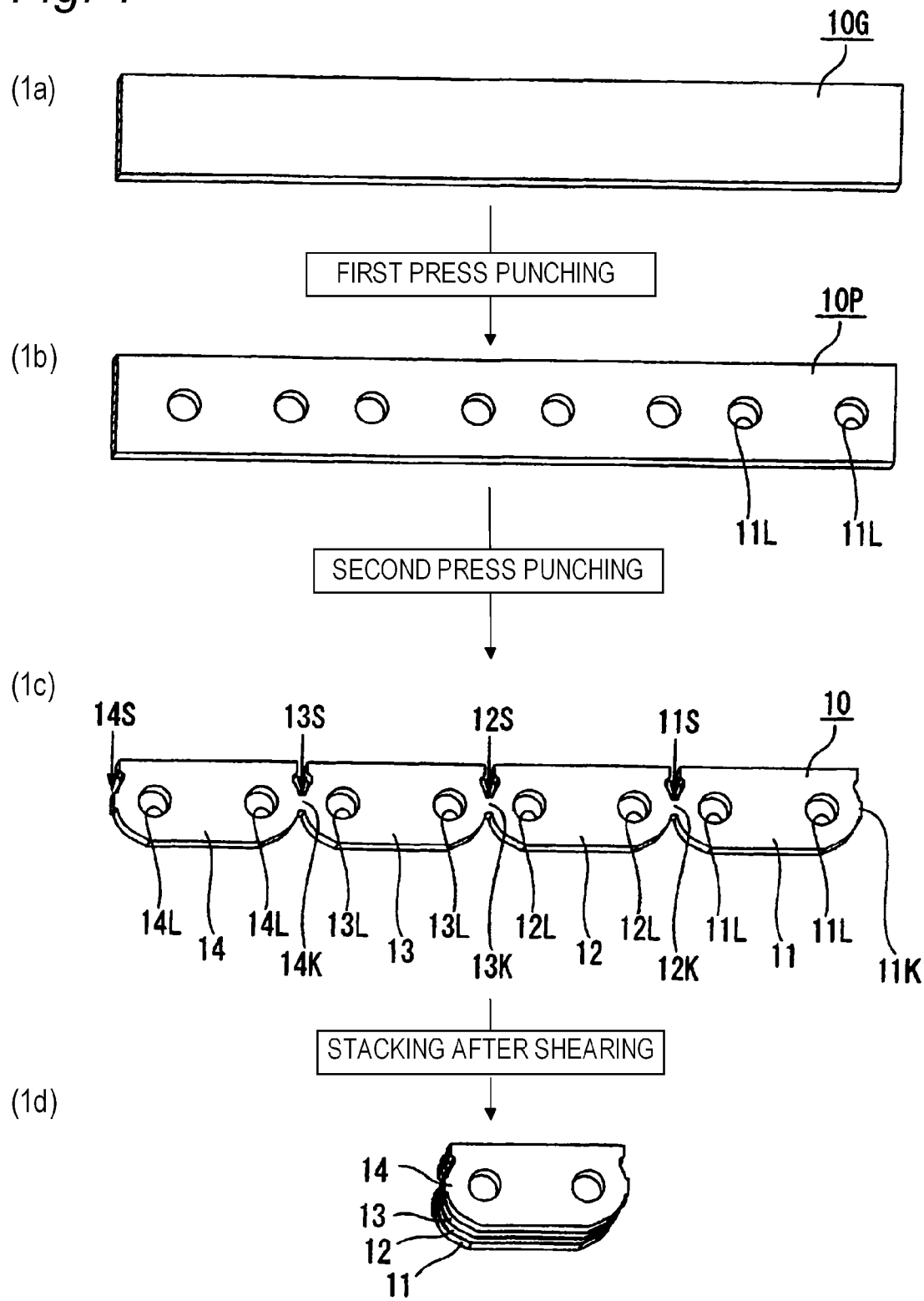

Fig. 4
[1]
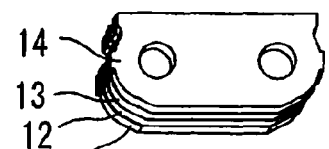
(a)
(b)
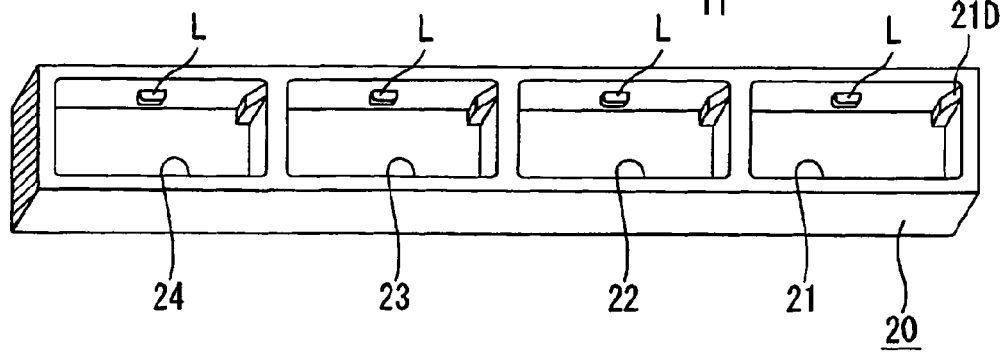
[2]
(a)
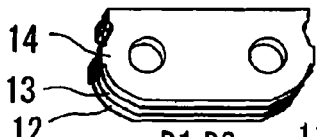
(b)
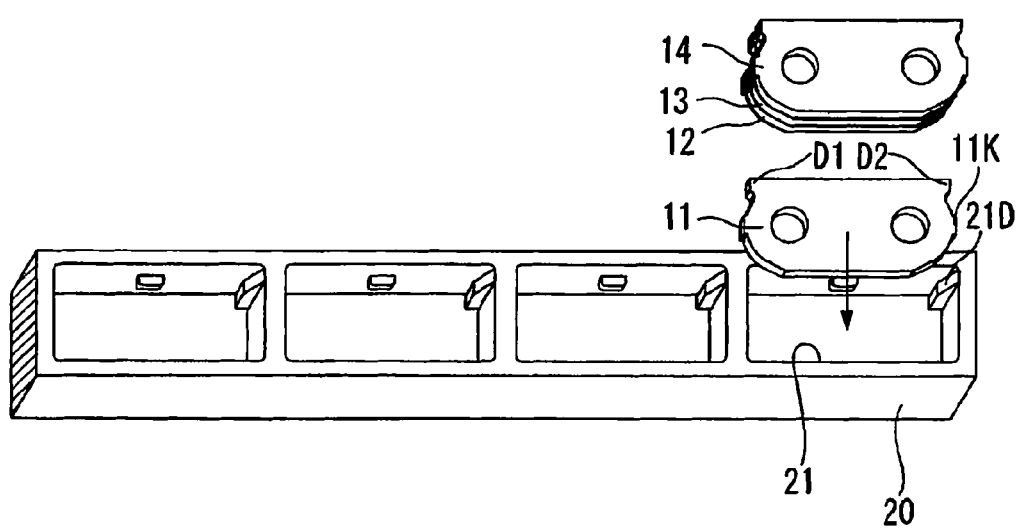
[3]
(a)
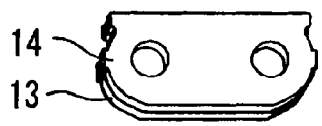
(b)
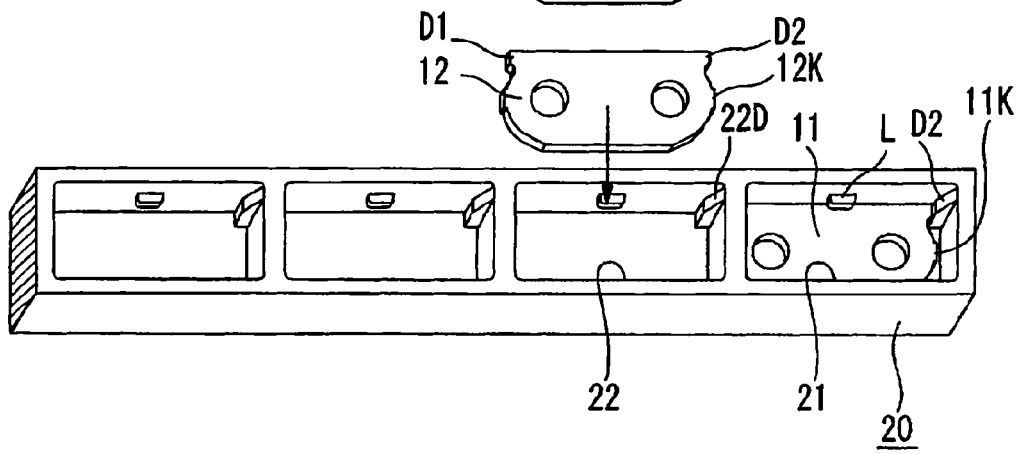

Fig. 5
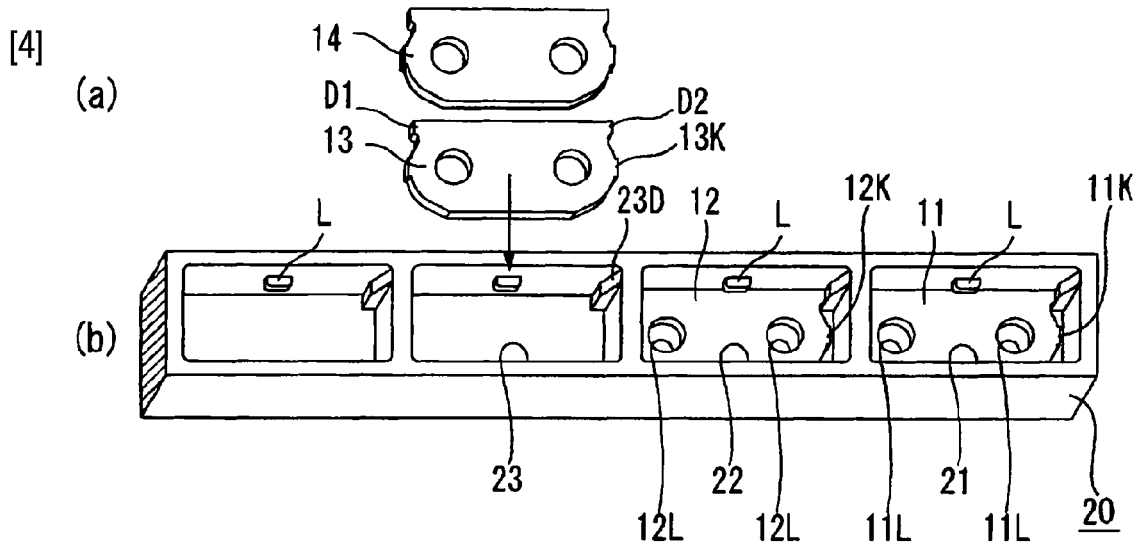
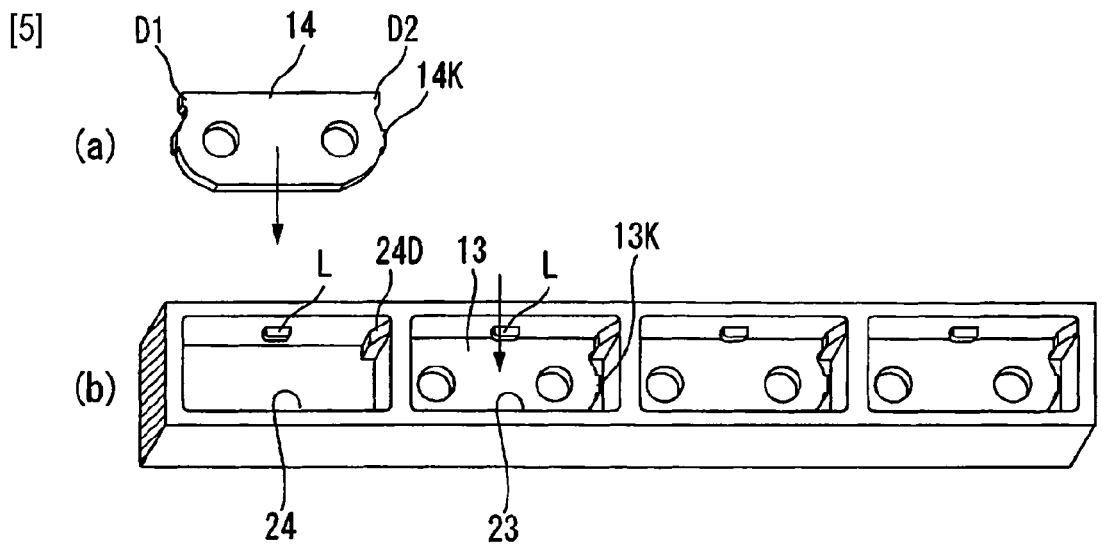
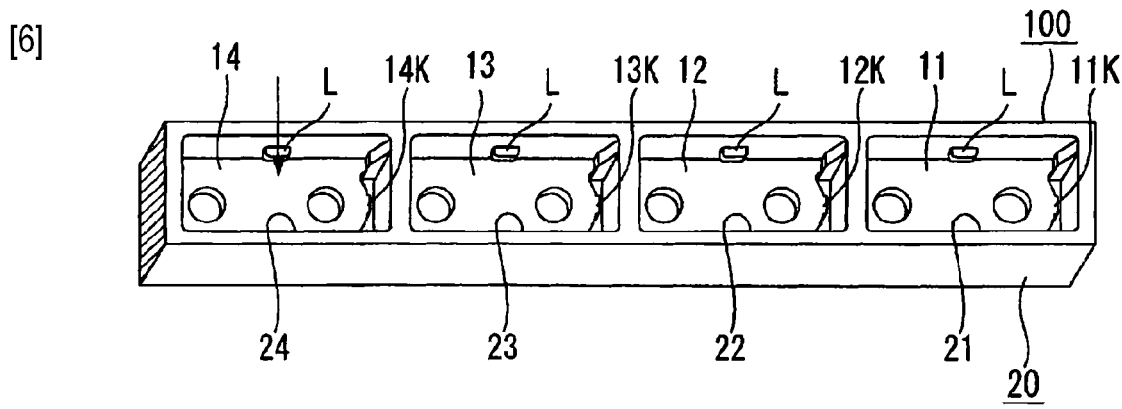

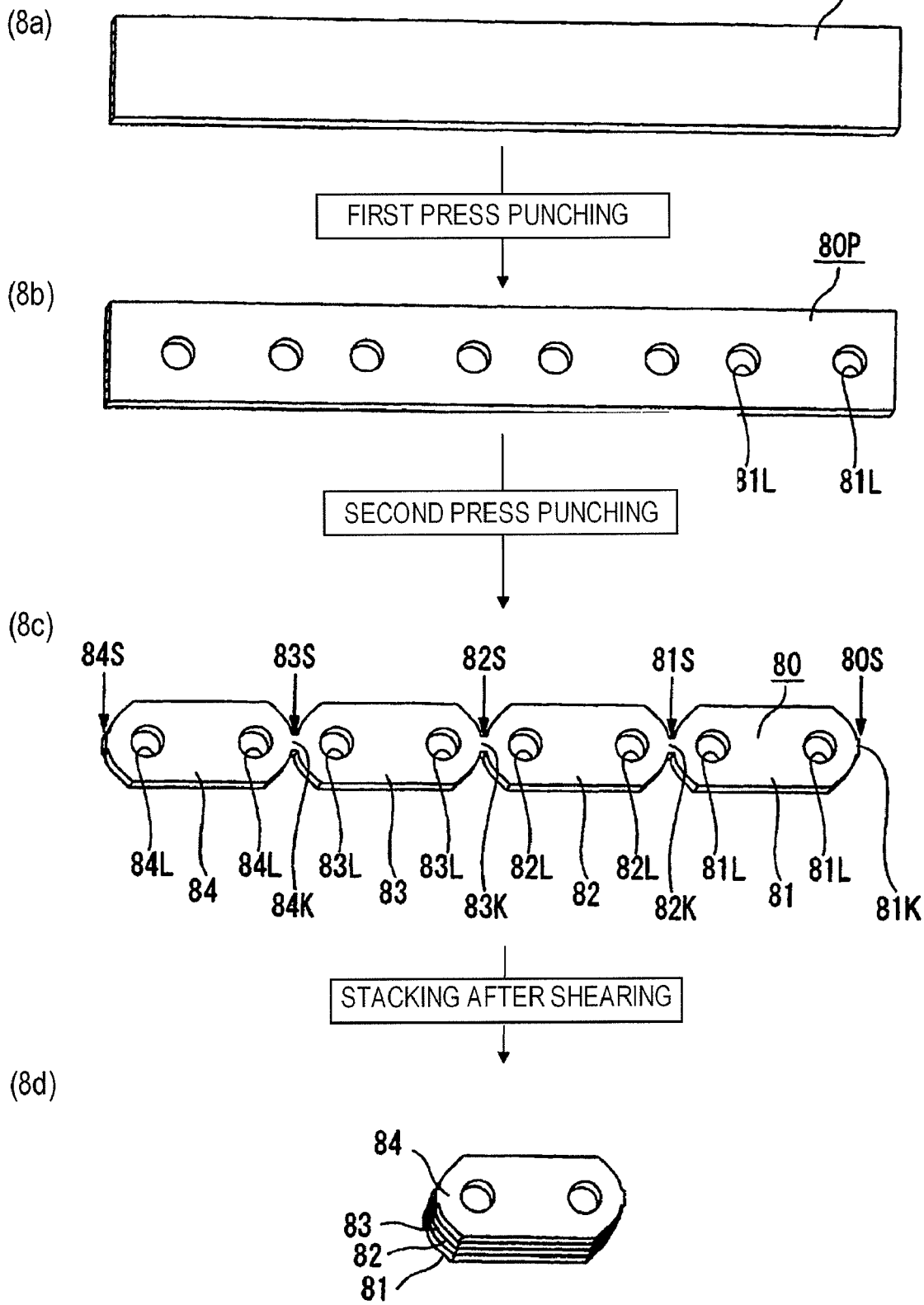

Fig. 9
PRIOR ART
[1] (a)
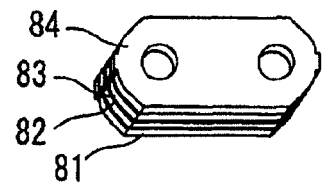
(b)
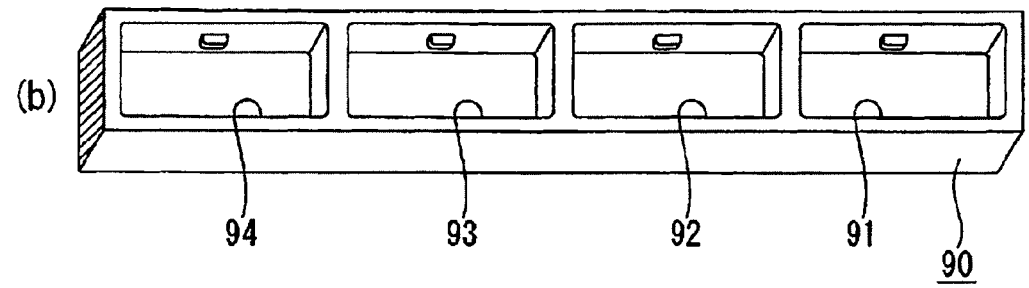
[2] (a)
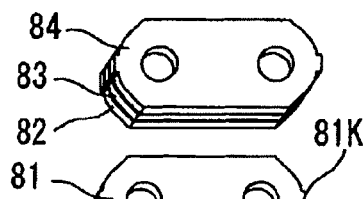
(b)
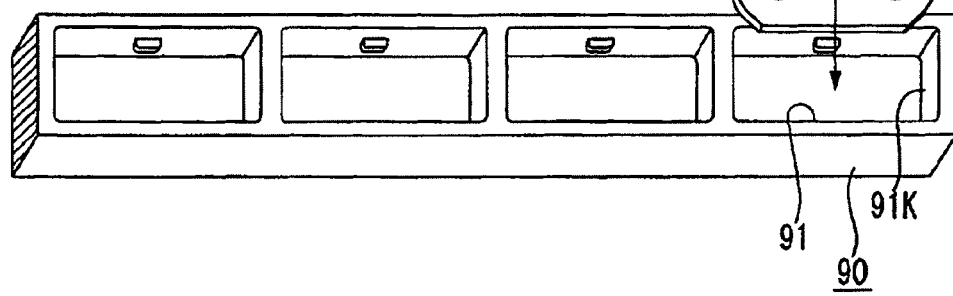
[3] (a)
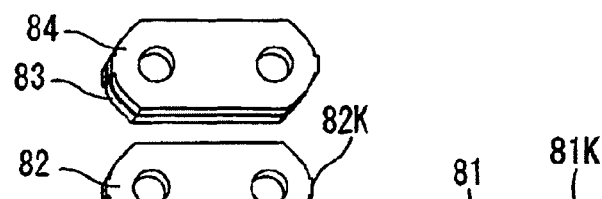
(b)
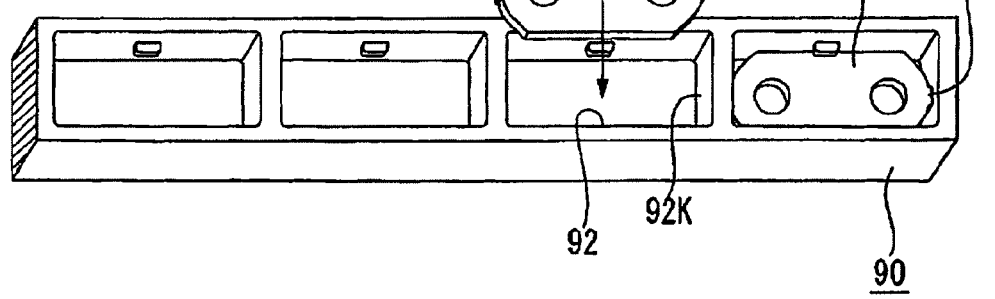

*Fig. 10*
PRIOR ART
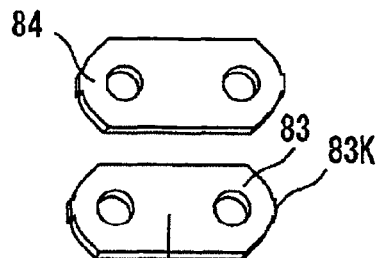
[4] (a)
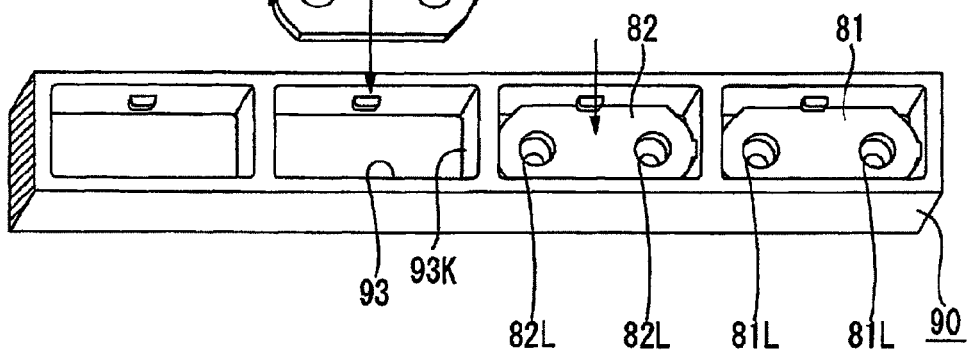
(b)
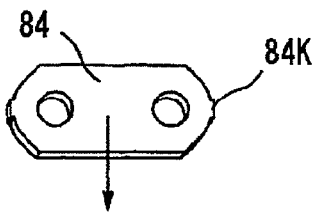
[5] (a)
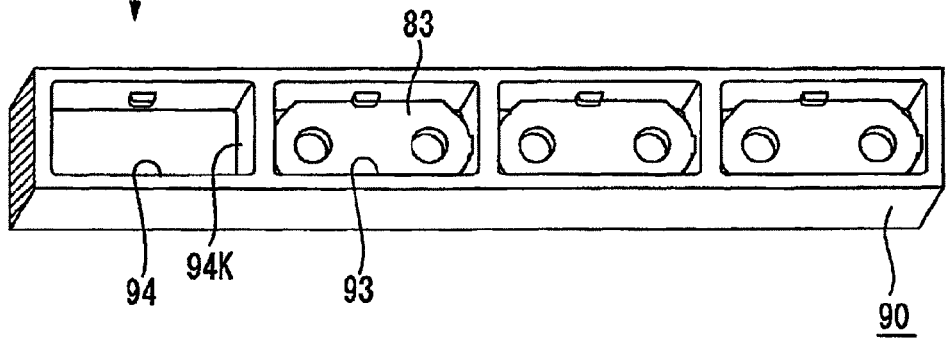
(b)
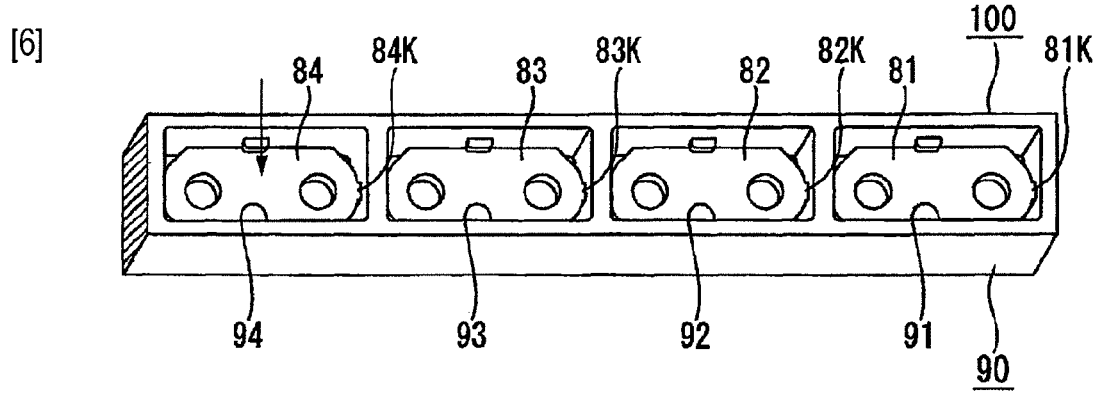
[6]

Fig. 12A PRIOR ART
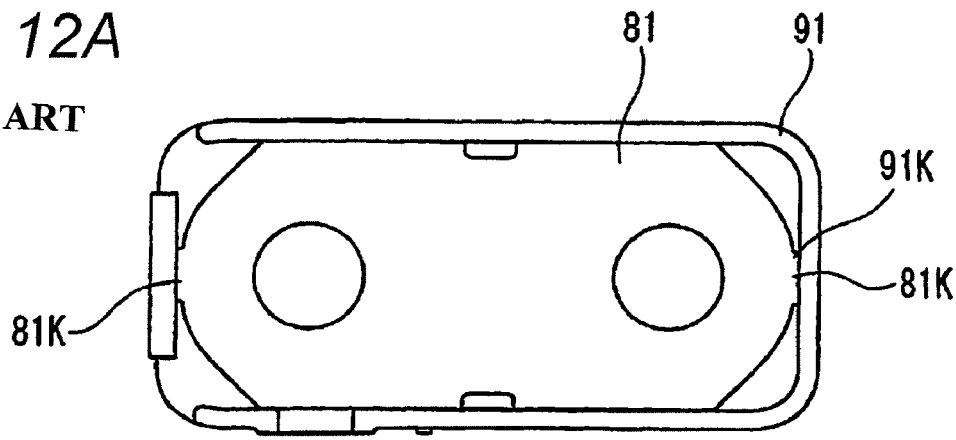
Fig. 12B PRIOR ART
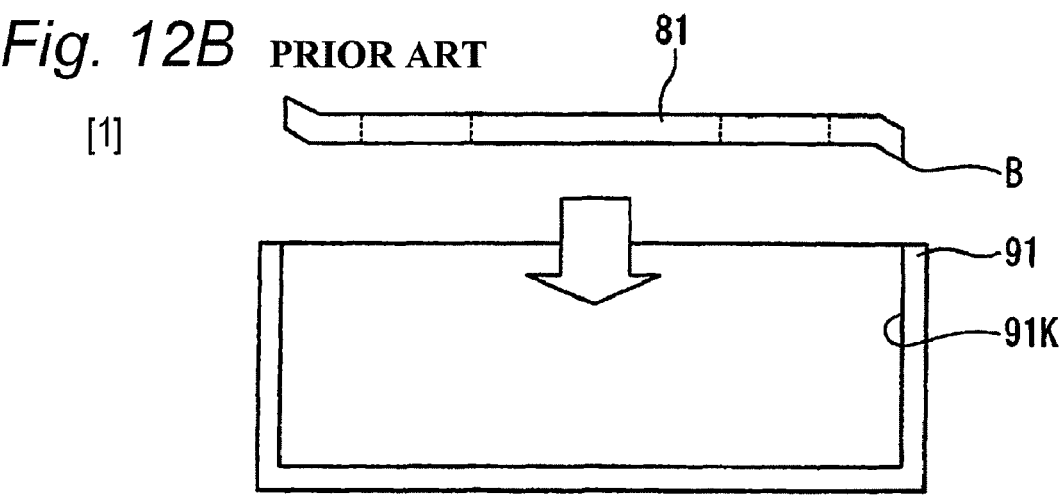
[2]
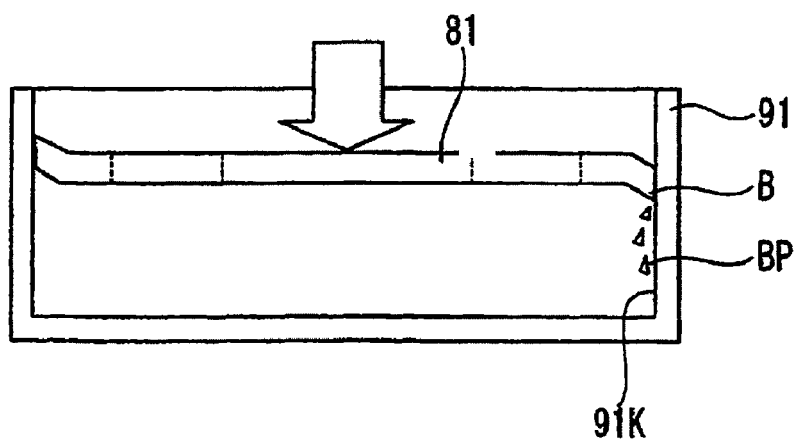

US 8,304,655 B2

BUSBAR FOR RESIN BASE OF BATTERY CONNECTION BOARD

BACKGROUND

The present invention relates to a synthetic resin base plate which accommodates busbars which are press punched and thereafter shear cut, and more particularly to a busbar which takes it into consideration that a resin case is prevented from being scratched by burrs produced at a portion of the busbar where it is shear cut and a construction of a synthetic resin base plate which accommodates the busbar.

In recent years, electric vehicles and hybrid cars have attracted people's attention as environment-friendly motor vehicles which will or are replacing motor vehicles run by gasoline and diesel engines. However, since electric vehicles and hybrid cars require a power supply of high voltage and high output, many batteries are required. In order for such many batteries to be used on electric vehicles and hybrid cars, a whole battery assembly needs to be small in size and hence, battery assembling techniques have become important.

A battery assembly described in Patent Document 1 is known as a related-art battery assembly.

In FIG. 6, a battery assembly 60 is made up of a large number of small planar batteries 61 which are aligned side by side. Each planar battery 61 has bolts functioning as a positive pole 62 and a negative pole 63 which are provided on front and rear end faces, respectively, so as to project therefrom. When disposed side by side, the planar batteries 61 are stacked together so that signs of electrodes of the adjacent planar batteries 61 become opposite, and the whole batteries are fastened to be fixed together by a belt.

In the battery assembly 60 in which the planar batteries 61 are disposed in the way described above, a negative terminal 63 of a first endmost planar battery 61 (a leftmost planar battery 61 in FIG. 6) and a positive terminal 62 of a second planar battery 61, which lies adjacent to the first endmost one, are connected together by a two-hole busbar 81 (refer to FIG. 7A) which is made of a thin, conductive, metallic plate. Similarly, a negative terminal 63 of a third planar battery 61 and a positive terminal 62 of a fourth planar battery 61 are connected together by a two-hole busbar 82 (refer to FIG. 7A). Similarly, a negative terminal 63 of a fifth planar battery 61 and a positive terminal 62 of a sixth planar terminal 61 are connected by a two-hole busbar 83 (refer to FIG. 7A). In this way, when a negative terminal 63 of a thirteenth planar battery 61 and a positive terminal 62 of a fourteenth planar battery 61 in FIG. 7A are then connected by a two-hole busbar 87 (refer to FIG. 7A), the positive terminals 62 and the negative terminals 63 on a far side of the battery assembly 60 (FIG. 6) are all connected to each other.

Here, the "two-hole busbars" will be described.

In FIG. 7A, the two-hole busbars are denoted by reference numerals 81 to 87 and constitute plate for connecting the bolts 62, 63 which are provided on the planar battery 61 (FIG. 6) with the bolts 62, 63 which are provided on the adjacent planar battery 61. The two-hole busbars 81 to 87 are each made of a thin, rectangular, conductive, metallic plate in which two holes are opened in proximity to a central portion thereof. Consequently, an interval between the two holes equals an interval defined between the positive electrode 62 and the negative electrode 63 of the planar batteries which lie adjacent to each other. The bolts 62, 63 are inserted through the corresponding holes, and thereafter, nuts N are fastened on the corresponding bolts 62, 63.

A synthetic resin base plate 101 is obtained through insert molding with the two-hole busbars 81 to 87 inserted in a resin which are disposed to be aligned into a line as is shown in FIG. 7A. By using the synthetic resin base plate 101 so molded, a large number of terminals can be connected easily and quickly.

A battery connection board 100 is made up of the synthetic resin base plate 101 and a cover 103 which is attached to an upper edge of the synthetic resin base plate 101 via a plurality of hinges 102 so as to be opened and closed freely. A portion of the battery connection board 100 shown in FIG. 6 is a rear side of the battery connection board 100 shown in FIG. 7A.

When connecting terminals of the battery assembly 60 on a near side thereof in FIG. 6, the terminals of the planar batteries 61 which are disposed at both end portions of the battery assembly 60 are not connected, respectively, with the terminals of the planar batteries 61 which lie adjacent to the planar batteries at the end portions. Thus, the connection of the terminals on the other side of the battery assembly 60 differs from the connection of the terminals on the one side in which the terminals are connected only by the two-hole busbars in that one-hole busbars are used. The terminals of the planar batteries 61 excluding those disposed at the end portions of the battery assembly 60 are connected by two-hole busbars as in the way described above. Consequently, a busbar 80' (refer to FIG. 7B) having a hole 80L' is connected to a positive terminal 62 of the first endmost planar battery 61. Then, a negative terminal 63 of the second planar battery 61, which lies adjacent to the first endmost one, and a positive terminal 62 of the third planar battery 61, which lies adjacent to the second one, are connected by a two-hole busbar 81 (refer to FIG. 7B). Similarly, a negative terminal 63 of the fourth planar battery 61 and a positive terminal 62 of the fifth planar battery 61 are connected by a two-hole busbar 82 (refer to FIG. 7B). In this way, when a busbar 80' (refer to FIG. 7B) having a hole 80L' is connected to a negative terminal 63 of the fourteenth planar battery 61 in FIG. 7B, the whole planar batteries 61 of the battery assembly 60 (FIG. 6) are connected in series between the positive terminal 62 and the negative terminal 63 which are individually connected by the busbars 80' having one hole 80L'.

A synthetic resin base plate 101' is obtained through insert molding with the one-hole busbar 80', the two-hole busbars 81 to 86 and the one-hole busbar 80' inserted in a resin which are disposed to be aligned into a line as is shown in FIG. 7B. By using the synthetic resin base plate 101' so molded singly, a large number of terminals can be connected easily and quickly.

A battery connection board 100 is made up of the synthetic resin base plate 101' and a cover 103' which is attached to an upper edge of the synthetic resin base plate 101' via a plurality of hinges 102' so as to be opened and closed freely. A portion of the battery connection board 100' shown in FIG. 6 is the same side of the battery connection board 100' shown in FIG. 7B.

The synthetic resin base plate 101 and the synthetic resin base plate 101' are fixed individually to the bolts 62, 63 on the front and rear end faces of the battery assembly 60, and thereafter the covers 103, 103' are bent individually through 90 degrees via the pluralities of hinges 102, 102' which are situated on the upper edges thereof. Then, locking portions K, K' thereof are brought into abutment with each other, whereby a cover is completed by causing both the locking portions K, K' to be fixed to each other.

Since the synthetic resin base plates 101, 101' described in Patent Document 1 are made of a resin through insert molding, the design of a mold becomes complex, and some skills are required when the mold so designed is used. This also requires time and labor hours, and hence, the production costs are increased. In addition, a failure at one portion deteriorates a whole base plate, and this causes a problem of a bad yield.
[Patent Document 1] Japanese Patent Publication Number 2000-149909 A Then, the applicant of the subject patent application devised a method for fabricating easily a synthetic resin base plate having the same shape and function as those of the synthetic resin base plate 101 without using insert molding. Hereinafter, regarding now this fabrication method as a conventional art, the fabrication method will be described by use of FIGS. 8 to 10.

FIG. 8 shows diagrams illustrating a fabrication process of two-hole busbars. In FIG. 8, shows perspective views of a thin conductive metallic plate in steps 8a to 8d. In the step 8a, the thin conductive metallic plate is used in fabricating busbars. In the step 8a, the thin conductive metallic plate is in which bolt insertion holes are opened in a first press punching. In the step 8a, series of chain-like connected busbars are made in a second press punching. In the step 8d, the series of chain-like connected busbars are shear cut and resulting individual busbars are stacked one on top of the other.

A holed thin conductive metallic plate 80P is prepared by opening bolt insertion holes 81L, 81L at the step 8b in a thin conductive metallic plate 80G at the step 8a in a first press punching. The bolts 62, 63, which are the terminals of the planar batteries 61 of the battery assembly 60 (FIG. 6), are inserted through these bolt insertion holes 81L finally and nuts are individually fastened on the corresponding bolts.

By a second press punching being applied to the holed thin conductive metallic plate 80P, a series of chain-like connected busbars 80 at the step 8c is obtained. Although a series of four connected busbars 81 to 84 is shown in the figure, in reality, a number of busbars 80 are connected to front- and rear-end busbars in a chain-like fashion. The holed thin conductive metallic plate 80P is press punched so as to leave connecting portions 82K to 84K so that the series of chain-like connected busbars 80 results. These connecting portions 82K to 84K constitute shear cutting portions 82S to 84S where the series of chain-like connected busbars 80 is finally shear cut by a shearing machine so as to be separated from each other. Then, the individual busbars are transferred to a busbar feeding position (at [1] in FIG. 9) in a resin case transfer section in a subsequent resin case transfer step in such a state that the individual busbars are sequentially stacked one on top of the other.

FIG. 9 shows, at [1] to [3], diagrams illustrating an order in which the busbars are sequentially accommodated in a resin case in the order of [1] to [3]. At each of [1] to [3], (a) is a perspective view showing a stack of busbars which are shear cut at the shear cutting portions and are then stacked one on top of the other as being situated above the busbar feeding position in the resin case transfer step, and (b) is a perspective view showing a resin case 20 transferred in the resin case transfer section.

The busbars, which are sequentially shear cut by the shearing machine in the separate step and are then stacked one on top of the other, are transferred to the resin case transfer step for accommodation in a resin case to thereby be placed above the busbar feeding position in the transfer section. In the resin case transfer step, a resin case 90 is transferred in a horizontal direction, and when a resin case 91 at a leading end of the resin case 90 reaches right below the busbar feeding position, a busbar 81 is caused to fall from the busbar feeding position into the resin case 91 as is shown at [2] in FIG. 9 for accommodation.

A recess portion 91K is formed in a center of a leading end of the resin case 91 in a direction in which the resin case 91 is transferred, and the connecting portion 81K of the busbar 81 is designed to fit in the recess portion 91K. Therefore, when the connecting portion 81K at a leading end of the busbar 81 which has fallen into the resin case 91 fits in the recess portion 91K, the busbar 81 is allowed to be pushed downwards while being kept horizontal by being so positioned by the fitment of the connecting portion 81K in the recess portion 91K. Then, the busbar 81 is brought into abutment with a stopper formed in a desired position within the resin case 91, whereupon the accommodation of the busbar 81 in the resin case 91 is completed as is shown at [3] in FIG. 9.

Next, in accommodating a subsequent busbar 82 in a subsequent resin case 92, the accommodation is implemented in the same way as described above. Namely, when the subsequent busbar 82 reaches right below the busbar feeding portion, the busbar 82 is caused to fall from the busbar feeding position into the resin case 92 for accommodation as is shown at [3] in FIG. 9. A recess portion 92K is also formed in a center of a leading end of the resin case 92 in a direction in which the resin case 92 is transferred and a connecting portion 82K of the busbar 82 is designed to fit in the recess portion 92K. Therefore, when the connecting portion 82K at a leading end of the busbar 82 which has fallen into the resin case 92 fits in the recess portion 92K, the busbar 82 is allowed to be pushed downwards while being kept horizontal by being so positioned by the fitment of the connecting portion 82K in the recess portion 92K. Then, the busbar 82 is brought into abutment with a stopper formed in a desired position within the resin case 92, whereupon the busbar 82 is accommodated finally in the resin case 92 as is shown at [4] in FIG. 10.

The accommodation of the busbars is implemented in the same way as described above. Namely, at [4] in FIG. 10, when a subsequent resin case 93 reaches right below the busbar feeding position, a busbar 83 is caused to fall into the resin case 93 for accommodation as shown at [4] in FIG. 10. When a connecting portion 83K at a leading end of the busbar 83 fits in a recess portion 93K formed in the resin case 93, the busbar 83 is allowed to be pushed downwards while being kept horizontal by being so positioned by the fitment of the connecting portion 83K in the recess portion 93K. Then, the busbar 83 is brought into abutment with a stopper formed in a desired position within the resin case 93, whereupon the busbar 83 is accommodated finally in the resin case 93 as is shown at [5] in FIG. 10.

Similarly, at [5] in FIG. 10, when a subsequent resin case 94 reaches right below the busbar feeding position, a busbar 84 is caused to fall into the resin case 94 for accommodation as shown at [5] in FIG. 10. When a connecting portion 84K at a leading end of the busbar 84 fits in a recess portion 94K formed in the resin case 94, the busbar 84 is allowed to be pushed downwards while being kept horizontal by being so positioned by the fitment of the connecting portion 84K in the recess portion 94K. Then, the busbar 84 is brought into abutment with a stopper formed in a desired position within the resin case 94, whereupon the busbar 84 is accommodated finally in the resin case 94 as is shown at [6] in FIG. 10.

In this way, all the busbars 81 to 84 shown are individually positioned accurately within the corresponding rein cases 91 to 94 for accommodation, whereby the synthetic resin base plate 101 (FIGS. 7, 8) is obtained through press punching and shear cutting without relying upon insert molding.

According to the approach of the conventional art in which the busbars are accommodated in the resin cases through press punching and shear cutting, the synthetic resin base plate can be fabricated without requiring any special skills compared with the approach utilizing insert molding which is described in Patent Document 1. In addition, the approach of the conventional art requires fewer labor hours and less time, and therefore, the fabrication costs can be reduced.

Various experiments were carried out by using the synthetic resin base plate 101 obtained according to the approach of the conventional art as shown in FIG. 6 to find the fact that a conduction failure occurred from time to time at the terminals of the synthetic resin base plate.

Then, investigations were carried out for a cause for the occurrence of such an conduction failure at the terminals of the synthetic resin base plate which was obtained through press punching and shear cutting according to the conventional art, as a result of which the applicant of the present invention found out that the conduction failure was caused by the following reasons.

In FIG. 11A, a shearing machine 120 includes a lower blade 120B which is formed at a corner of a table 120T and an upper blade 120C which is caused to descend along the lower blade 120B. A shearing target material is placed so that a shearing portion thereof is positioned to be aligned with the lower blade 120B at the corner of the table 120T, and the upper blade 120C is then caused to descend so as to shear cut the shearing target material.

Then, the series of connected busbars 81 to 84 at a process 8c which is obtained as a result of the second press punching according to the conventional art is placed on the table 120T of the shearing machine 120 ([1] of FIG. 11A). Firstly, a leading end portion 80S of the busbar 81 is shorn ([2] of FIG. 11A). Following this, the series of connected busbars 81 to 84 is caused to slide in a traveling direction so that a searing portion 81S is positioned to be aligned with the lower blade 120B at the corner of the table 120T ([3] of FIG. 11A) for implementing shearing ([4] of FIG. 11A). By this action, the busbar 81 is shear cut as is shown at [2] in FIG. 9 to thereby be separated from the remaining connected busbars to fall.

FIG. 11B is a vertical sectional view of the busbar 81 that is obtained in the way described above.

According to FIG. 11B, since shearing is implemented downwards by the upper blade 120C which descends, a burr B is generated in a lower position of a shorn portion of the busbar 81 at a leading end in the traveling direction, and in contrast, a shear drop D is formed in a lower position of the shorn portion. By the same principle, a burr B is generated in an upper position of a shorn portion of the busbar 81 at a rear end in the traveling direction, and in contrast, a shear drop D is formed in a lower position of the shorn portion.

The recess portion 91K is formed in the center of the leading end of the resin case 91 in the direction in which the busbar 81 is transferred and the connecting portion 81K of the busbar 81 is designed to fit in the recess portion 91K for positioning thereof. Consequently, in order for the positioning of the busbar 81 to be implemented properly, the connecting portion 81K needs to fit in the recess portion 91K to such an extent that the connecting portion 81K lightly contacts the recess portion 91K.

By doing so, when the busbar 81 is accommodated within the resin case 91, as is shown at [1] in FIG. 12B, since the burr B is generated in the lower position of the shorn portion of the busbar 81 at the leading end in the traveling direction thereof, in the event that the busbar 81 is placed in the resin case 91 and then continues to be pushed downwards as it is, should there be a design error on at least either the busbar 81 or the resin case 91, the burrs B at the leading end of the busbar 81 scratches a wall surface of the resin case 91, leading to a risk that burr-scratched resin powder BP is produced to fall or scatter.

Thus, there has been a risk that the burr-scratched resin powder BP produced in the way described above enters a fastening portion between the busbar 81 and the battery to cause a conduction failure. Consequently, in order to prevent the occurrence of such a conduction failure, a person performing this busbar accommodating operation has been required to pay much attention in adjusting the position of the busbar 81 so that the busbar 81 does not contact the wall surface of the resin case 91.

Thus, as has been described heretofore, in the busbars according to the conventional art, in accommodating the resin busbar plates in the busbar accommodating portions, the positioning of the busbar is implemented at confronting straight-line portions of the busbar in a minor diameter direction and at apex portions thereof in a major diameter direction of an elliptical shape of the busbar or at the shorn portions of the busbar. Since the series of chain-like connected busbars is shorn one by one, burrs and shear drops are generated on the opposite sides of the shorn portions at both the ends of the individual busbars so shorn. In inserting the busbar into the busbar accommodating portion, a wall surface of the busbar accommodating portion is scratched by the burr which projects towards the busbar accommodating portion, whereby there has been caused a fear that resin scratched off the wall surface causes an conduction failure or a fear that the battery is heated by such an conduction failure.

SUMMARY

It is therefore one advantageous aspect of the invention to provide a busbar which can prevent the generation of burr-scratched resin powder by preventing a burr projecting towards a busbar accommodating portion from scratching a wall surface of the accommodating portion when being inserted into the busbar accommodating portion and hence can prevent the occurrence of an conduction failure by burr-scratched resin powder and the heating of a battery attributed to such an conduction failure and a synthetic resin base plate for accommodating the busbar.

According to one aspect of the invention, there is provided a busbar configured to be accommodated in a case, the busbar comprising:

a metal plate;

a regulating portion, provided at a part of an edge of the metal plate, having a burr extending in a direction opposite to an inserting direction in which the busbar is inserted into the case, and configured to come in contact with a part of an inner wall of the case so as to regulate a position of the busbar; and a connected portion, provided at a part of the edge of the metal plate, having a burr extending in the inserting direction, and configured to be disposed so as not to contact the inner wall of the case.

The busbar may be configured such that: the regulating portion is formed by press molding, and the connected portion is formed by shearing.

The busbar may further comprise a other connected portion, provided at a part of the edge opposite to the part of the edge where the connected portion is provided, wherein the regulating portion is disposed at a position displaced toward the other connected portion from a position being on a straight line, the straight line being which includes the connected portion and is orthogonal to a direction connecting the connected portion and the other connected portion.

The busbar may be configured such that the regulating portion includes: a first regulating portion, provided at a first part of the edge of the metal plate, having the burr extending in the direction opposite to the inserting direction, and configured to come in contact with a first part of the inner wall of the case; and a second regulating portion, provided at a second part of the edge of the metal plate opposite to the first regulating portion, having the burr extending in the direction opposite to the inserting direction, and configured to come in contact with a second part of the inner wall of the case opposing the first part of the inner wall.

According to another aspect of the invention, there is provided a board for connecting batteries, comprising:
the busbar; and
a case formed with an accommodating space where the busbar is inserted therein,
wherein an inner face of the accommodating space has a pair of guide parts opposing each other, each of the guide parts is tapered so that a distance between each other becomes to be short according to the inserting direction.

The board for connecting batteries may be configured such that the regulating portion includes: a first regulating portion, provided at a first part of the edge of the metal plate, having the burr extending in the direction opposite to the inserting direction, and configured to come in contact with one of the guide parts; and a second regulating portion, provided at a second part of the edge of the metal plate opposite to the first regulating portion, having the burr extending in the direction opposite to the inserting direction, and configured to come in contact with the other of the guide parts.

The board for connecting batteries may be configured such that: the case is formed with a plurality of accommodating spaces, the each of the accommodating spaces accommodates the busbar, and an inner face of each of the accommodating space has the pair of guide parts.

BRIEF DESCRIPTION OF THE DRAWINGS

FIG. 1 is a diagram illustrating a fabrication process of two-hole busbars according to the present invention.

FIG. 4 shows diagrams illustrating an order in which the busbars according to the invention are accommodated within the resin cases in the order of [1] to [3].

FIG. 5 shows diagrams illustrating a procedure for accommodating the two remaining busbars in corresponding resin cases.

FIG. 8 shows diagrams illustrating a fabrication process of two-hole busbars of the related-art battery assembly.

FIG. 9 shows diagrams illustrating an order in which the busbars of the conventional-art battery assembly are sequentially accommodated in a resin case in the order of [1] to [3].

FIG. 10 shows diagrams illustrating a procedure for accommodating the two remaining busbars of the conventional-art battery assembly in corresponding resin cases.

FIG. 12A shows a plan view showing a state in which a busbar of the conventional-art battery assembly is accommodated within a resin case.

FIG. 12B is a vertical sectional view showing a state resulting before the busbar of the conventional-art battery assembly is accommodated within the resin case.

DETAILED DESCRIPTION OF EXEMPLIFIED EMBODIMENTS

Hereinafter, a busbar and a synthetic resin base plate according to the invention will be described in detail based on the drawings in which a shorn portion having a burr projecting towards a busbar accommodating portion does not function to position of the busbar relative to the busbar accommodating portion and hence there is no risk that the shorn portion scratches a resin wall surface of the busbar accommodating portion, thereby making it possible to prevent the occurrence of an conduction failure due to scratched resin and heating of a battery attributed to such an conduction failure.

FIG. 1 shows diagrams illustrating a fabrication process of two-hole busbars according to the invention, of which a step 1a is a perspective view of a thin conductive metallic plate for use in fabrication of busbars, a step 1b is a perspective view of the thin conductive metallic plate in which bolt insertion holes are opened in a first press punching, and a step 1c is a perspective view of a series of chain-like connected busbars which is obtained in a second press punching.

A holed thin conductive metallic plate 10P is prepared by opening bolt insertion holes 11L, 11L shown in a step 1d in a thin conductive metallic plate 10G shown in the step 1a in a first press punching.

Figure 6:
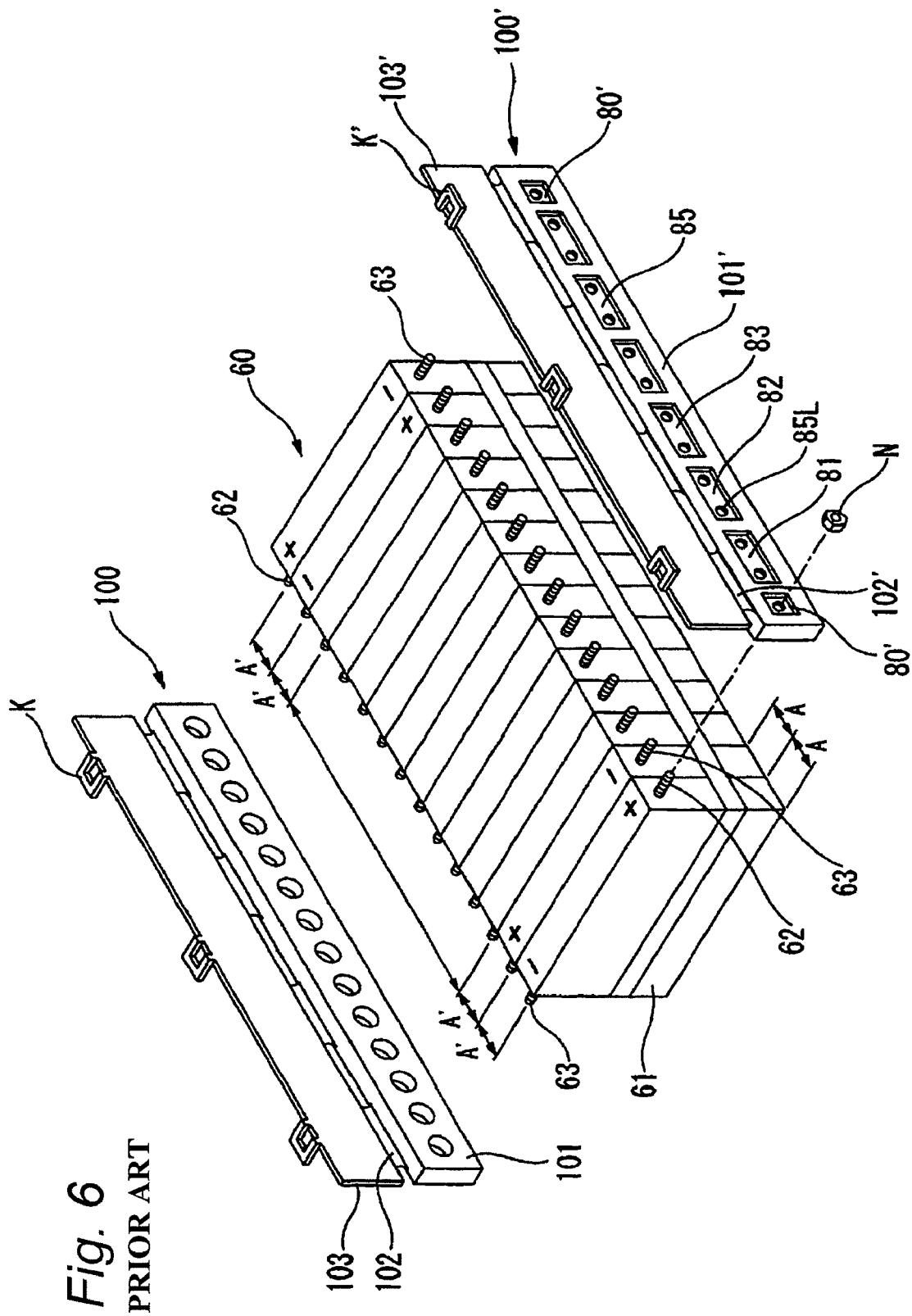
FIG. 6 is an exploded perspective view of a related-art battery assembly.
Figure 7A:
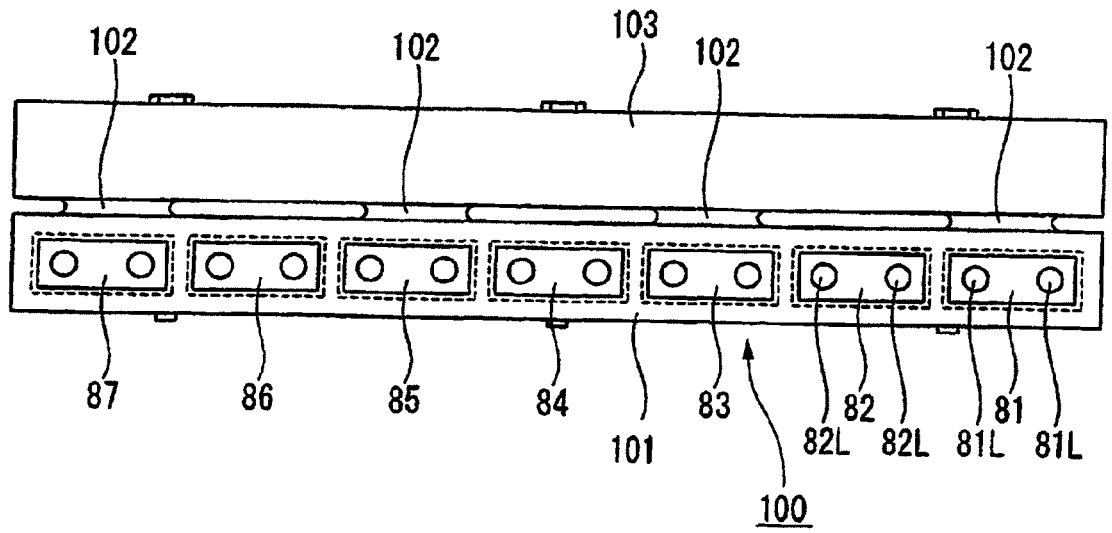
FIG. 7A is a plan view of a first battery connection board of the related-art battery assembly.
Figure 7B:
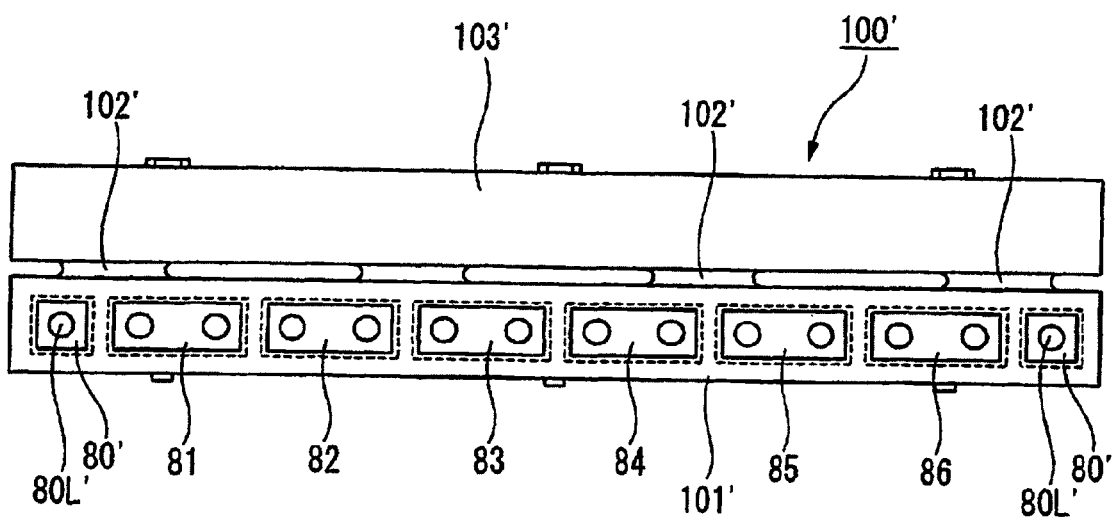
FIG. 7B is a plan view of a second battery connection board of the related-art battery assembly.

Bolts 62, 63, which are terminals of planar batteries 61 of a battery assembly (FIG. 6), are finally inserted through the bolt insertion holes 11L, and nuts are fastened on the corresponding bolts.

A series of chain-like connected busbars 10 shown in the step 1c is obtained by applying a second press punching to the holed thin conductive metallic plate 10P. In the figure, although the series of chain-like connected busbars 10 is illustrated as being a series of four connected busbars 11 to 14, in reality, the series of chain-like connected busbars 10 has a number of chain-like connected busbars which are connected individually to front and rear end thereof. The holed thin conductive metallic plate 10P is press punched so as to leave connecting portions 12K to 14K, so that the series of four connected busbars 11 to 14 is prepared. The series of four connected busbars is finally shear cut at these connecting portions 12K to 14K which then function as shearing portions 12S to 14S by a shearing machine, whereby the series of four connected busbars is separated from each other, and the resulting individual busbars are stacked together one on top of the other as is shown in the step 1d, a stack of busbars being transferred to a busbar feeding position (FIG. 4) in a resin case transfer section in a subsequent resin case transfer step.

Figure 2A:
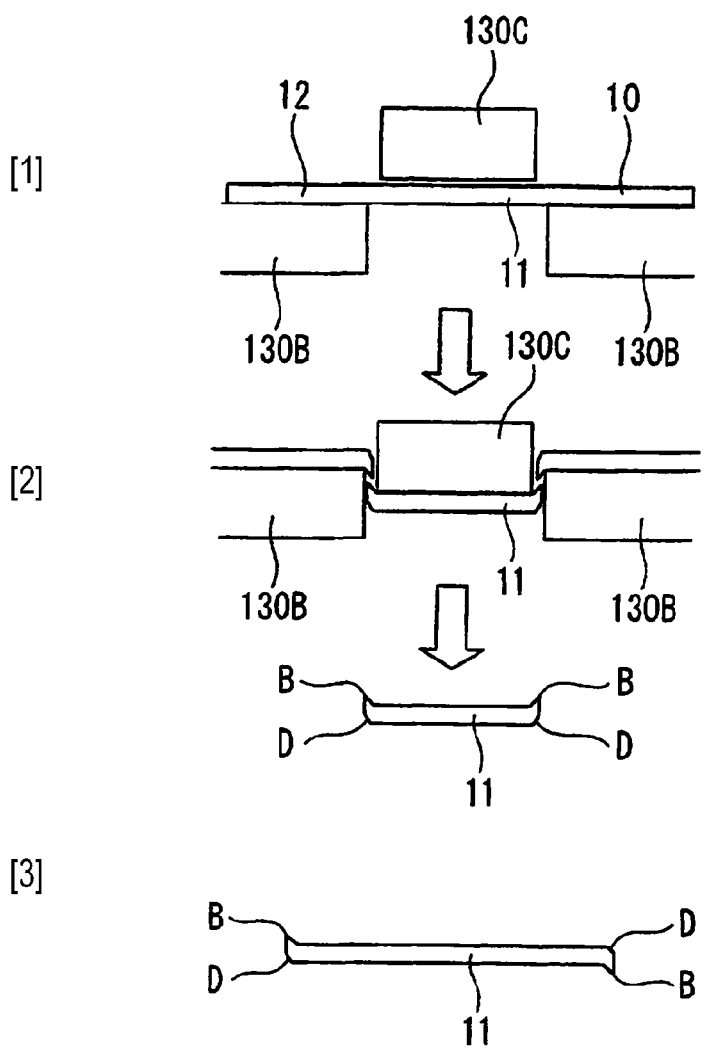
FIG. 2A shows sectional views illustrating a step of press punching the series of chain-like connected busbars by a press machine.
Figure 2B:
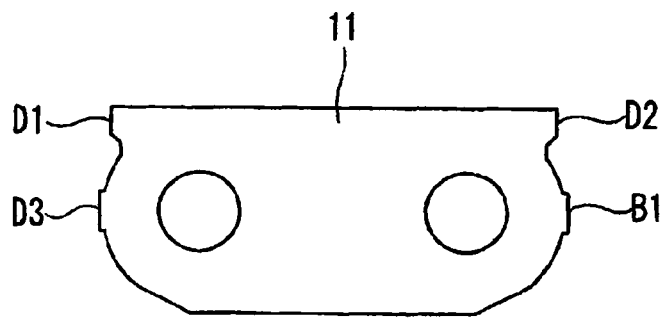
FIG. 2B is a sectional view of the busbar which is shorn off the series of chain-like connected busbars.
Figure 2C:
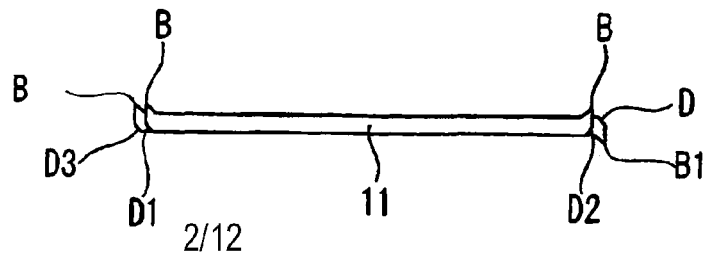
FIG. 2C is a bottom view of a finally obtained busbar shown in FIG. 1.

FIGS. 2A to 2C show diagrams illustrating a process of fabricating a busbar 11. FIG. 2A shows vertical sectional views [1], [2] illustrating press punching steps that are carried out in the order of [1] to [3] and a vertical sectional view [3] of a resulting press-punched busbar 11. FIG. 2B is a vertical sectional view of the busbar 11 which is shorn off the series of chain-like connected busbars 10. FIG. 2C shows a bottom view and a front view of the finally obtained busbar 11.

In FIG. 2A, a press punching machine 130 includes an upper die 130C and lower dies 130B which are provided at an interval which enables the insertion of the upper die 130C into therebetween. A press punching target material is placed so as to bridge both the lower dies 130B, 130B and by the upper die 130C being caused to descend, the press punching target material is press punched by the upper die 130C.

Then, the holed thin conductive metallic plate 10P shown in FIG. 1 which is obtained by the first press punching is placed on both the lower dies 130B, 130B of the press punching machine 130 (at [1] in FIG. 2A), and by causing the upper die 130C to descend, the holed thin conductive metallic plate 10P is press punched (at [2] in FIG. 2A), whereby a series of chain-like connected busbars 10 as shown in FIG. 1 is obtained. Only the perimeter of a busbar 11 is press punched and a connecting portion 12K is, of course, left intact. Similarly, the holed thin conductive metallic plate 10P is caused to move a distance equaling the length of the busbar 11 in a traveling direction on both the lower dies 130B of the press punching machine 130, and thereafter, the upper die 130 is caused to descend, whereby a busbar 12 is obtained. Only the perimeter of the busbar 12 is press punched and a connecting portion 12K is left intact, whereby the busbar 12 remains in connection with the busbar 11 at the connecting portion 12K. Thus, by repeating the same operations, the series of chain-like connected busbars 10 is obtained.

A vertical sectional view of the busbar 11 press punched in the way described above is shown at [3] in FIG. 2A. A point to be noticed is the fact that all burs B are generated on a top surface side of the press punched busbar so as to project upwards, while no burr B is generated on a bottom surface side thereof and what is generated on the bottom surface side is only a shear drop D.

Figure 11A:
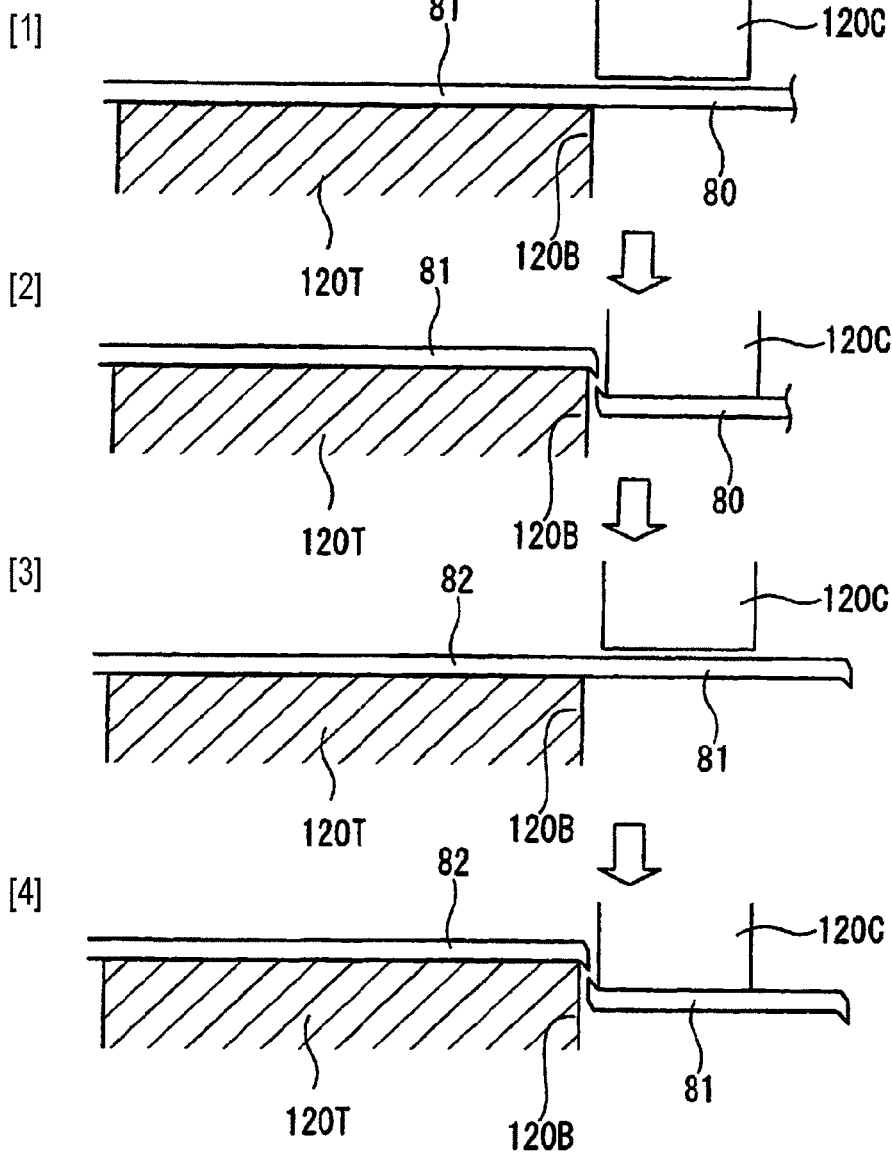
FIG. 11A shows a shear cutting procedure of the conventional-art battery assembly.
Figure 11B:
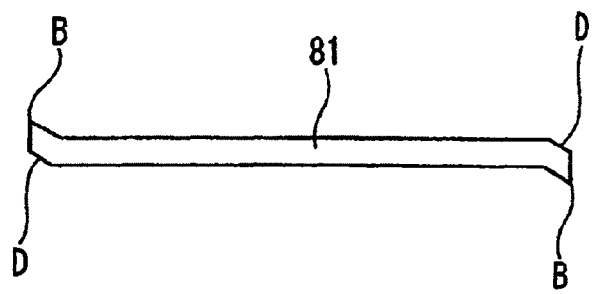
FIG. 11B is a sectional view of a busbar shear cut according to the procedure of the conventional-art battery assembly.

On the other hand, a vertical sectional shape of the shorn busbar 11 becomes what is described in FIG. 11B, and therefore, a shape shown in FIG. 2B results in which a burr B is generated in a lower position of a shorn portion at a leading end in the traveling direction of the busbar 11 and in contrast, a shear drop D is formed in an upper position of the shorn portion, whereas a burr B is generated in an upper position of a shorn portion at a rear end in the traveling direction of the busbar 11 and in contrast, a shear drop D is formed in a lower position of the shorn portion.

FIG. 2C shows a plan view and a vertical sectional view of the busbar according to the invention which is fabricated based on the two facts. That is, there is generated no burr on the bottom surface side of the press punched busbar; and the burrs B are generated on the bottom surface side of the shorn busbar.

As is seen when comparing the plan view of the busbar according to the invention with the plan view of the busbar according to the related art, although the shapes of lower portions than a line connecting the two holes are the same (a semi-elliptic or oval shape), the shapes of upper portions than the line connecting the two holes are different. In the busbar according to the related art, the shapes of the upper portion and the lower portion are the same (a semi-elliptic or oval shape). In the busbar of the invention shown in FIG. 2C, however, projecting abutment portions D1, D2 are formed at both ends of an upper side of the busbar 11. In addition, the length between the connecting portions differs between the busbars of the related art and the invention. In the busbar according to the related art, since the connecting portions also function to position the busbar, the connecting portions are made long because the connecting portions need to be brought into contact with the recess portions in the resin case. In contrast, in the busbar of the invention, since the connecting portions do not have to function to position the busbar, the connecting portions are made short so that they do not come into contact with recess portions in the resin case. The busbar of the invention is positioned by the projecting abutment portions D1, D2 at both the ends of the upper side thereof.

In other words, the projecting abutment portion D1, is disposed at a position displaced toward the connecting portion D4 from a position being on a straight line, the straight line being which includes the connecting portion D3 and is orthogonal to a direction connecting the connecting portion D3 and the connecting portion D4.

When looking at the vertical sectional shape of the busbar 11 of the invention, as is shown in FIG. 2C, there is generated no burr B (but the shear drops D are formed) on bottom surfaces of both the projecting abutment portions D1, D2, and therefore, even in the event that the projecting abutment portions D1, D2 are brought into contact with an inner wall surface of the resin case while being positioned, there is no fear that the inner wall surface is scratched by the projecting abutment portions D1, D2. In addition, since the shorn connecting portions do not function to position the busbar 11, the connecting portions are given a length by which the connecting portions are kept withdrawn from the inner wall surface of the resin case, and therefore, even in the event that there are generated burrs B at the shorn connecting portions, there is caused no fear that the burrs scratch the inner wall surface of the resin case. In addition, as to a length between both the projecting abutment portions D1, D2 of the busbar and a length between both the connecting portions D3, B1 of the busbar, as is shown in FIG. 2C, the length between the connecting portions D3, B1 is made longer than the length between the projecting abutment portions D1, D2.

Figure 3A:
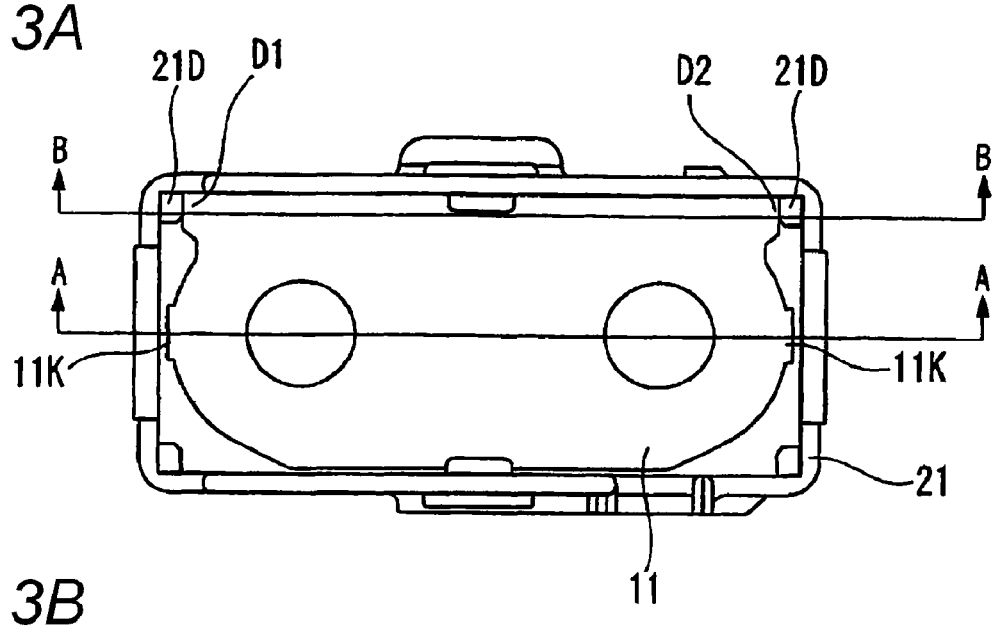
FIG. 3A is a plan view showing a state in which the busbar according to the present invention is accommodated within a resin case according to the present invention.

FIG. 3A is a plan view showing a state in which the busbar 11 according to the invention is accommodated in the resin case 21 according to the invention, a vertical sectional view taken along the line A-A in FIG. 3A and a vertical sectional view taken along the line B-B in FIG. 3A, the vertical sectional views showing an intermediate stage of an accommodating operation of the busbar 11 which is finally accommodated within the resin case 21 as is shown in FIG. 3A.

The recess portion 91K (FIGS. 12A and 12B) provided in the resin case of the related art is not provided in the resin case 21 according to the invention. On the contrary, guides 21D for positioning both the projecting abutment portions D1, D2 at both the ends of the upper side of the busbar 11 according to the invention are formed in the resin case 21. As is seen from FIG. 3C, the guides 21D are tapered so that a distance therebetween is extended as they extend upwards for facilitation of the insertion of the upper side of the busbar 11 at the respective projecting abutment portions D1, D2.

Figure 3B:
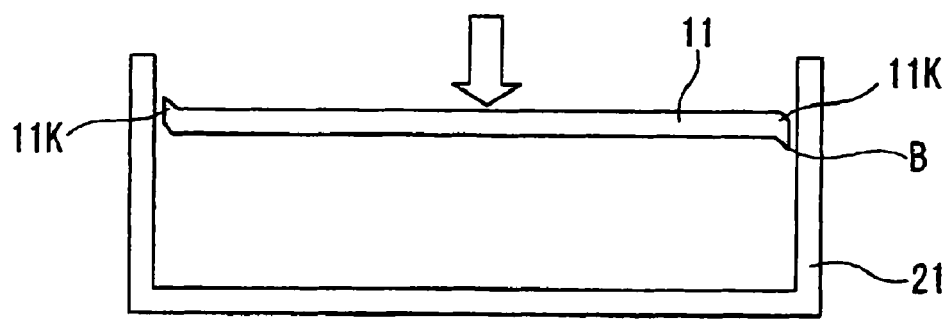
FIG. 3B is a vertical sectional view taken along the line A-A in FIG. 3A showing an intermediate stage of an accommodation of the busbar as shown in FIG. 3A.

When the busbar 11 according to the invention is accommodated within the resin case 21, as is shown in FIG. 3B, although the burr B is generated in the lower position of the shorn portion of the busbar 11, since the busbar 11 does not reach the wall surface of the resin case 21, there occurs no such situation that the burr B at the leading end of the busbar 11 scratches the wall surface of the resin case 21 to produce burr-scratched resin powder BP which would otherwise fall and scatter.

Figure 3C:
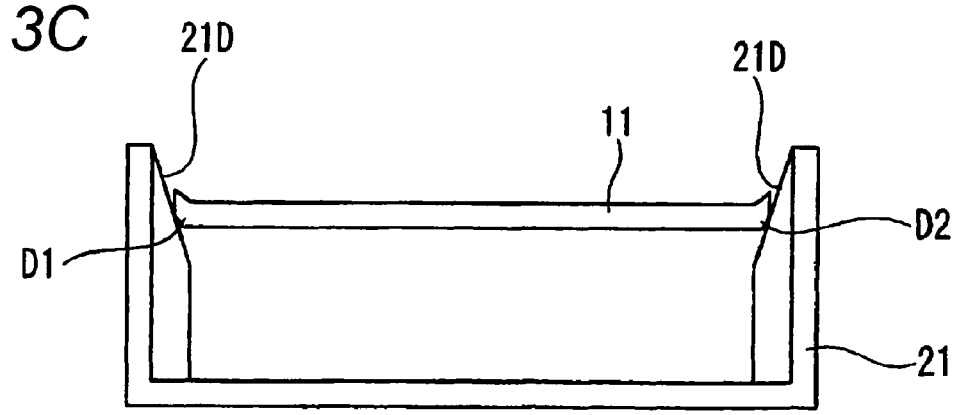
FIG. 3C is a vertical sectional view taken long the line B-B in FIG. 3A showing the same intermediate stage of the accommodation of the busbar.

In addition, as is shown in FIG. 3C, since no burr B is generated on the bottom surface of the busbar 11, even in the event that the portions of the busbars 11 where the projecting abutment portions D1, D2 are formed are brought into contact with the wall surfaces of the resin case 21 for positioning the busbar 11 relative to the resin case 21, there are generated only the shear drops D at the portions in question, there can occur no such situation that the projecting abutment portions D1, D2 scratch the wall surfaces of the resin case 21 to produce bur-scratched resin power BP which would otherwise fall and scatter.

In the event that the busbars 11 to 14 are also press punched to be separated from each other only through press punching with the shear cutting step shown in FIG. 1 omitted, all burrs generated project upwards, whereby the problem of the resin case being scratched by the burrs so generated can be eliminated.

However, in the event that the busbars 11 to 14 are prepared only through press punching, it is inevitable in any way that press removal debris is produced between the connecting portion (the positioning portion) at the rear end of the busbar 11 and the connecting portion (the positioning portion) at the front end of the adjacent busbar 12, which increases the waste of material, and this, on the contrary, provides a problem with effective utilization of material.

Consequently, the preparation of busbars 11 to 14 only through press punching is not adopted. Instead, the busbars 11 to 14 are prepared to be separated from each other by shear cutting the connecting portions by the shearing machine, thereby making it possible to prevent the waste of material.

FIG. 4 shows, at [1] to [3], diagrams illustrating an order in which the busbars according to the invention are sequentially accommodated in resin cases in the order of [1] to [3]. At each of [1] to [3], (a) is a perspective view showing a stack of busbars which are shear cut at the shear cutting portions and are then stacked one on top of the other as being situated above the busbar feeding position in the resin case transfer section in the resin case transfer step, and (b) is a perspective view showing a resin case 20 transferred in the resin case transfer section.

In the resin case transfer step, the resin case 20 is transferred in a horizontal direction, and when the resin case 21 at a leading end of the resin case 20 reaches right below the busbar feeding position (a state at [1] in FIG. 4), the busbar 21 is caused to fall from the busbar feeding position into the resin case 21 as is shown at [2] in FIG. 4 for accommodation.

The tapered guides 21D are (FIGS. 3A, 3C) are formed at the frontmost and rearmost end portions of the resin case 21 in the transfer direction thereof (however, in FIG. 4, the tapered guide 21D at the rearmost end is not visible as FIG. 4 is the perspective view), and the projecting abutment portions D1, D2 (FIG. 2C) of the busbar 11 are designed to be brought into contact with the tapered guides 21D. Therefore, the busbar 11 which has fallen into the resin case 21 is positioned horizontal by the projecting abutment portions D1, D2 of the busbar 11 which function as positioning members and is allowed to continue to be pushed downwards along the tapered guides 21D while being so positioned until the busbar 11 fits in as deep as below a lock L for accommodation while being fixed by the lock L. In this way, the busbar 11 is accommodated in the resin case 21, whereby the accommodation of the busbar 11 in the resin case 21 is firstly completed as is shown in at [3] in FIG. 4. As this occurs, the shorn portion 11K, having burrs generated thereon, of the busbar 11 is formed so as to define a gap between the confronting wall surface of the resin case 21 and itself (refer to FIG. 3C which illustrates this). Therefore, there occurs no such situation that the shorn portion 11K scratches the wall surface of the resin case 21, and hence, no burr is generated.

Next, in accommodating a subsequent busbar 12 in a subsequent resin case 22, the accommodation is implemented in the same way as described above. Namely, when the subsequent busbar 12 reaches right below the busbar feeding portion, the busbar 12 is caused to fall from the busbar feeding position into the resin case 22 for accommodation as is shown at [3] in FIG. 4. Tapered guides 22D (refer to FIGS. 3A, 3C) are also formed at frontmost and rearmost end portions of the resin case 22 in the transfer direction thereof, and projecting abutment portions D1, D2 (refer to FIG. 2C) of the busbar 12 are designed to be brought into contact with the tapered guides 22D. Therefore, the busbar 12 which has fallen into the resin case 22 is positioned horizontal by the projecting abutment portions D1, D2 of the busbar 12 which function as positioning members and is allowed to continue to be pushed downwards along the tapered guides 22D while being so positioned until the busbar 12 fits in as deep as below a lock L for accommodation while being fixed by the lock L as is shown at [4] in FIG. 5 As this occurs, a shorn portion 12K having burrs generated thereon of the busbar 12 is formed so as to define a gap between a confronting wall surface of the resin case 22 and itself. Therefore, there occurs no such situation that the shorn portion 12K scratches the wall surface of the resin case 22, and hence, no burr is generated.

FIG. 5 shows diagrams illustrating a procedure for accommodating the two remaining busbars 13, 14 in corresponding resin cases 23, 24. In this case, too, as with the accommodation of the busbar 12 in the resin portion 22, when the resin case 23 reaches right below the busbar feeding position, the busbar 13 is caused to fall into the resin case 23 for accommodation as shown at [3] in FIG. 4. Tapered guides 23D (refer to FIGS. 3A, 3C) are also formed at frontmost and rearmost end portions of the resin case 23 in the transfer direction thereof, and projecting abutment portions D1, D2 (refer to FIG. 2C) of the busbar 13 are designed to be brought into contact with the tapered guides 23D. Therefore, the busbar 13 which has fallen into the resin case 23 is positioned horizontal by the projecting abutment portions D1, D2 of the busbar 13 which function as positioning members and is allowed to continue to be pushed downwards along the tapered guides 23D while being so positioned until the busbar 13 fits in as deep as below a lock L for accommodation while being fixed by the lock L as is shown at [5] in FIG. 5 As this occurs, a shorn portion 13K having burrs generated thereon of the busbar 13 is formed so as to define a gap between a confronting wall surface of the resin case 23 and itself. Therefore, there occurs no such situation that the shorn portion 13K scratches the wall surface of the resin case 23, and hence, no burr is generated.

Similarly, at [5] in FIG. 5, when the subsequent resin case 24 reaches right below the busbar feeding position, the busbar 14 is caused to fall into the resin case 24 for accommodation as shown at [5] in FIG. 5. Tapered guides 24D (refer to FIGS. 3A, 3C) are also formed at frontmost and rearmost end portions of the resin case 24 in the transfer direction thereof, and projecting abutment portions D1, D2 (refer to FIG. 2C) of the busbar 14 are designed to be brought into contact with the tapered guides 24D. Therefore, the busbar 14 which has fallen into the resin case 24 is positioned horizontal by the projecting abutment portions D1, D2 of the busbar 14 which function as positioning members and is allowed to continue to be pushed downwards along the tapered guides 24D while being so positioned until the busbar 14 fits in as deep as below a lock L for accommodation while being fixed by the lock L as is shown at [6] in FIG. 5 As this occurs, a shorn portion 14K having burrs generated thereon of the busbar 14 is formed so as to define a gap between a confronting wall surface of the resin case 24 and itself. Therefore, there occurs no such situation that the shorn portion 14K scratches the wall surface of the resin case 24, and hence, no burr is generated.

In this way, all the busbars 11 to 14 shown are positioned accurately to be accommodated in the corresponding resin cases 21 to 24, and there is produced no burr-scratched resin powder.

Thus, as has been described heretofore, according to the invention, since the projecting abutment portions are provided which project further than the arc portions on the sides of the connecting portions and in which the distance between the leading end thereof and the confronting wall surface of the busbar accommodating portion is made shorter than the distance between the shorn connecting portion and the confronting wall surface of the busbar accommodating portion, there occurs no such situation that the shorn portion having the burrs projecting towards the busbar accommodating portion functions to position the busbar relative to the busbar accommodating portion, and hence, there is no risk that the shorn portion scratches the busbar accommodating portion. Consequently, the occurrence of a conduction failure due to resin powder which would otherwise be produced as a result of scratching the busbar accommodating portion by burrs and heating of the battery attributed to such an conduction failure can be prevented.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

While the busbar accommodating process of the invention is described as the stack of busbars which are press punched and shear cut and are then stacked one on top of the other in the separate steps being transferred to above the busbar feeding position in the resin case transfer step for batch feeding of the busbars, the invention is not, of course, limited to the process described. For example, a real-time feeding may be adopted in which a series of chain-like connected busbars resulting from press punching is shear cut sequentially to fall sequentially within resin cases therebelow for accommodation.

The disclosures of Japanese Patent Application No. 2009-119981 filed May 18, 2009 including specification, drawings and claims is incorporated herein by reference in its entirety.

What is claimed is:

1. A busbar configured to be accommodated in a case, the busbar comprising:
   a metal plate;
   a regulating portion, provided at a part of an edge of the metal plate, having a burr extending in a direction opposite to an inserting direction in which the busbar is inserted into the case, and configured to come in contact with a part of an inner wall of the case so as to regulate a position of the busbar; and
   a connected portion, provided at a part of the edge of the metal plate, having a burr extending in the inserting direction, and configured to be disposed so as not to contact the inner wall of the case.

2. The busbar as set forth in claim 1, wherein:
   the regulating portion is formed by press molding, and the connected portion is formed by shearing.

3. The busbar as set forth in claim 1, further comprising:
   another connected portion, provided at a part of the edge opposite to the part of the edge where the connected portion is provided,
   wherein the regulating portion is disposed at a position displaced toward the other connected portion from a position being on a straight line, the straight line being which includes the connected portion and is orthogonal to a direction connecting the connected portion and the other connected portion.

4. The busbar as set forth in claim 1, wherein:
   the regulating portion includes:
   a first regulating portion, provided at a first part of the edge of the metal plate, having the burr extending in the direction opposite to the inserting direction, and configured to come in contact with a first part of the inner wall of the case; and
   a second regulating portion, provided at a second part of the edge of the metal plate opposite to the first regulating portion, having the burr extending in the direction opposite to the inserting direction, and configured to come in contact with a second part of the inner wall of the case opposing the first part of the inner wall.

5. A board for connecting batteries, comprising:
   the busbar set forth in claim 1; and
   a case formed with an accommodating space where the busbar is inserted therein,
   wherein an inner face of the accommodating space has a pair of guide parts opposing each other, each of the guide parts is tapered so that a distance between each other becomes to be short according to the inserting direction.

6. The board for connecting batteries set forth in claim 5, wherein:
   the regulating portion includes:
   a first regulating portion, provided at a first part of the edge of the metal plate, having the burr extending in the direction opposite to the inserting direction, and configured to come in contact with one of the guide parts; and
   a second regulating portion, provided at a second part of the edge of the metal plate opposite to the first regulating portion, having the burr extending in the direction opposite to the inserting direction, and configured to come in contact with the other of the guide parts.

7. The board for connecting batteries set forth in claim 5, wherein:
   the case is formed with a plurality of accommodating spaces,
   the each of the accommodating spaces accommodates the busbar, and
   an inner face of each of the accommodating space has the pair of guide parts.

* * * * *